(12) United States Patent
Kim

(10) Patent No.: US 12,361,264 B2
(45) Date of Patent: Jul. 15, 2025

(54) METHOD AND SYSTEM FOR LOCAL COMPRESSION OF ARTIFICIAL INTELLIGENCE MODEL

(71) Applicant: NOTA, INC., Daejeon (KR)

(72) Inventor: Tae-Ho Kim, Daejeon (KR)

(73) Assignee: Nota Inc., Daejeon (KR)

(*) Notice: Subject to any disclaimer, the term of this patent is extended or adjusted under 35 U.S.C. 154(b) by 0 days.

(21) Appl. No.: 18/923,458

(22) Filed: Oct. 22, 2024

(65) Prior Publication Data

US 2025/0131253 A1    Apr. 24, 2025

(30) Foreign Application Priority Data

Oct. 23, 2023  (KR) .................. 10-2023-0142230

(51) Int. Cl.
*G06N 3/0495* (2023.01)
*G06N 3/082* (2023.01)

(52) U.S. Cl.
CPC .......... *G06N 3/0495* (2023.01); *G06N 3/082* (2013.01)

(58) Field of Classification Search
CPC .............................. G06N 3/0495; G06N 3/082
USPC ......................................................... 706/15
See application file for complete search history.

(56) References Cited

U.S. PATENT DOCUMENTS

2022/0092425 A1\* 3/2022 Miret ................. G06N 3/0464
2022/0253713 A1  8/2022 Amid et al.

FOREIGN PATENT DOCUMENTS

| KR | 10-1431194 | 8/2014 |
|---|---|---|
| KR | 10-2021-0079154 | 6/2021 |
| KR | 10-2023-0038636 | 3/2023 |
| KR | 10-2701708 | 8/2024 |

OTHER PUBLICATIONS

Tao, et al., "Structured Pruing for Efficient Generative Pre-trained Language Models", Findings of the Association for Computational Linguistics: ACL 2023, pp. 10880-10895, Jul. 9-14, 2023 (Year: 2023).\*
Ma, et al., "LLM-Pruner: On the Structural Pruning of Large Language Models", NeurIPS 2023, 2023 (Year: 2023).\*
Wang, et al., "Structured Pruning of Large Language Models", arXiv:1910.04732v2 [cs.CL] Mar. 28, 2021 (Year: 2021).\*
Ma et al., "LLM-Pruner: On the Structural Pruning of Large Language Models," National University of Singapore, (2023).
Request for the Submission of an Opinion for KR Application No. 10-2023-0142230, mailed Jan. 19, 2024.
Written Decision on Registration for KR Application No. 10-2023-0142230, mailed Jul. 23, 2024.
Translation of Allowed Claims and Figures for KR Application No. 10-2023-0142230, allowed Jul. 23, 2024.

\* cited by examiner

*Primary Examiner* — Tsu-Chang Lee
(74) *Attorney, Agent, or Firm* — CHRISTENSON O'CONNOR JOHNSON KINDNESS PLLC (57) ABSTRACT

Disclosed is a method and system for local compression of an artificial intelligence (AI) model. A local compression method for a model may include receiving a pretrained model as input; selecting a layer group as a portion of the input model; and partially compressing the selected layer group and retraining the compressed layer group, and the retraining of the compressed layer group may include retraining the compressed layer group based on input data and output data prestored for the selected layer group.

10 Claims, 8 Drawing Sheets

METHOD AND SYSTEM FOR LOCAL COMPRESSION OF ARTIFICIAL INTELLIGENCE MODEL

CROSS-REFERENCE TO RELATED APPLICATION(S)

This application claims the priority benefit of Korean Patent Application No. 10-2023-0142230, filed on Oct. 23, 2023, in the Korean Intellectual Property Office, the disclosure of which is incorporated herein by reference.

BACKGROUND

1. Field of the Invention

Example embodiments relate to a method and system for local compression of an artificial intelligence (AI) model.

2. Description of the Related Art

A large language model (LLM) is a type of artificial intelligence (AI) trained on large corpus of text data to generate a human-like response to a natural language input and is a language model that includes an artificial neural network having numerous parameters (usually, billions of weights or more). This LLM may be trained with a significant amount of unlabeled text using self-supervised learning or semi-supervised learning.

Fine-tuning refers to a process of fine-tuning a pretrained LLM to perform a specific task. Basically, the LLM may perform a general language understanding generating task as a large-scale language model, but fine-tuning may represent a process of retraining this general model to be fit and specialized for a specific problem or domain. By retraining the LLM using data required for a specific task, the LLM may exhibit better performance in the corresponding task. For example, the LLM may be applied to various specific tasks, such as translation, emotional analysis, question-and-answer, and the like, personalization of the LLM becomes possible through fine-tuning.

However, there is an issue that cost for retraining the LLM is very large.

Reference material includes Korean Patent Registration No. 10-1431194.

SUMMARY

Example embodiments may provide a local compression method for a model and system that may reduce retraining cost through local compression of an artificial intelligence (AI) model.

According to an example embodiment, there is provided a local compression method for a model performed by a computer device including at least one processor, the method including receiving, by the at least one processor, a pretrained model as input; selecting, by the at least one processor, a layer group as a portion of the input model; and partially compressing, by the at least one processor, the selected layer group and retraining the compressed layer group, wherein the retraining of the compressed layer group includes retraining the compressed layer group based on input data and output data prestored for the selected layer group.

According to an aspect, the prestored input data and output data may include input data to a first layer of the selected layer group and output data from a last layer of the selected layer group.

According to another aspect, the retraining may include performing fine-tuning on the compressed layer group using input data for retraining that is designated based on the prestored input data and ground truth for the retraining that is designated based on the output data.

According to still another aspect, the input model may include a large language model (LLM) that includes the plurality of transformer block layers, and the selecting of the layer group may include determining importance of each of the plurality of transformer block layers and selecting the layer group that at least includes a transformer block layer selected according to the importance.

According to still another aspect, the selecting of the layer group may include computing a cosine similarity between i) a residual connection for an input of a block of said each of the plurality of transformer block layers and ii) a sum of operation results of the block and the residual connection, and computing the importance of each of the plurality of transformer block layers such that the importance relatively decreases as an increase in the computed cosine similarity.

According to still another aspect, the retraining may include compressing the layer group by removing the selected transformer block layer from the selected layer group.

According to an example embodiment, there is provided a computer program storing a computer-readable record medium to execute the method on the computer device in conjunction with the computer device.

According to an example embodiment, there is provided a non-transitory computer-readable record medium storing instructions that, when executed by a processor, cause the processor to execute the method on the computer device.

According to an example embodiment, there is provided a computer device including at least one processor configured to execute computer-readable instructions on the computer device, wherein the at least one processor is configured to receive a pretrained model as input, to select a layer group that includes some layers of the input model for local compression from the input model, and to partially compress the selected layer group and retrain the compressed layer group, and retraining of the compressed layer group includes retraining the compressed layer group based on input data and output data prestored for the selected layer group.

According to some example embodiments, there may be provided a local compression method for a model and system that may reduce retraining cost through local compression of an artificial intelligence model.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, example embodiments will be described with reference to the accompanying drawings.

A local compression system for a model according to example embodiments may be implemented by at least one computer device and a local compression method for a model according to example embodiments may be performed through at least one computer device included in the local compression system for the model. A computer program according to an example embodiment may be installed and executed on the computer device, and the computer device may perform the local compression method for the model according to example embodiments under control of the executed computer program. The computer program may be stored in computer-readable recording media to execute the local compression method for the model on the computer device in conjunction with the computer device.

Figure 1:
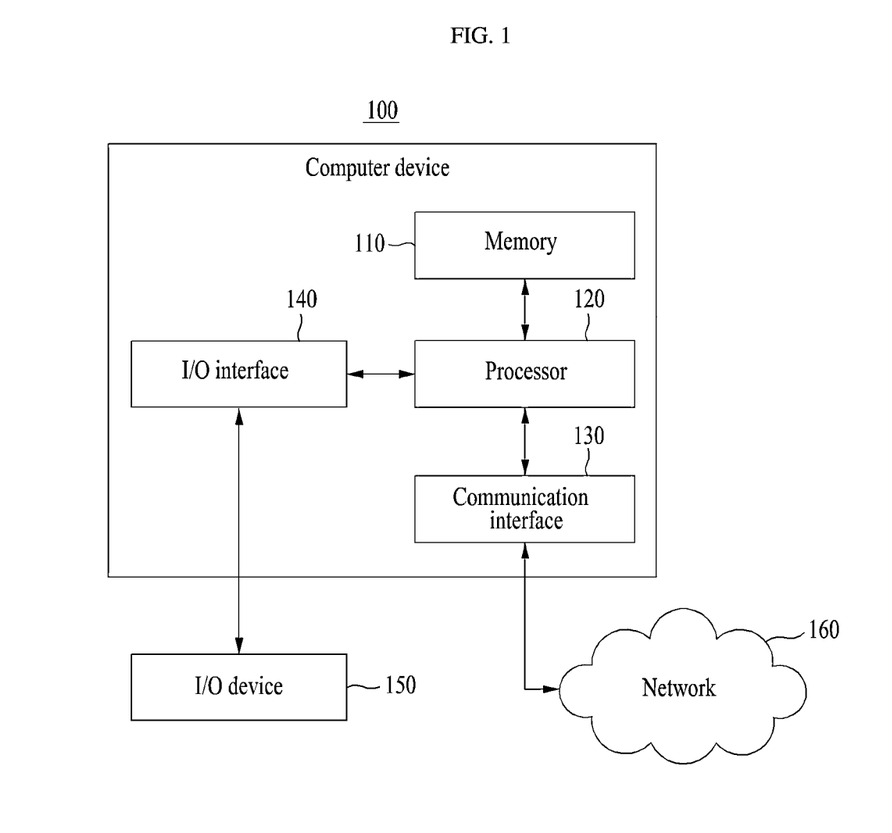
FIG. 1 is a diagram illustrating an example of a computer device according to an example embodiment.

FIG. 1 is a diagram illustrating an example of a computer device according to an example embodiment. Referring to FIG. 1, a computer device 100 may include a memory 110, a processor 120, a communication interface 130, and an input/output (I/O) interface 140. The memory 110 may include a permanent mass storage device, such as a random access memory (RAM), a read only memory (ROM), and a disk drive, as a non-transitory computer-readable recording medium. Here, the permanent mass storage device, such as a ROM and a disk drive, may be included in the computer device 100 as a permanent storage device separate from the memory 110. Also, an operating system (OS) and at least one program code may be stored in the memory 110. Such software components may be loaded to the memory 110 from another non-transitory computer-readable recording medium separate from the memory 110. The other non-transitory computer-readable recording medium may include a non-transitory computer-readable recording medium, for example, a floppy drive, a disk, a tape, a DVD/CD-ROM drive, a memory card, etc. According to other example embodiments, software components may be loaded to the memory 110 through the communication interface 130, instead of the non-transitory computer-readable recording medium. For example, the software components may be loaded to the memory 110 of the computer device 100 based on a computer program installed by files received over a network 160.

The processor 120 may be configured to process instructions of a computer program by performing basic arithmetic operations, logic operations, and I/O operations. The computer-readable instructions may be provided by the memory 110 or the communication interface 130 to the processor 120. For example, the processor 120 may be configured to execute received instructions in response to a program code stored in a storage device, such as the memory 110.

The communication interface 130 may provide a function for communication between the communication device 100 and another apparatus over the network 160. For example, the processor 120 of the computer device 100 may forward a request or an instruction created based on a program code stored in the storage device such as the memory 110, data, and a file, to other apparatuses over the network 160 under control of the communication interface 130. Inversely, a signal, an instruction, data, a file, etc., from another apparatus may be received at the computer device 100 through the communication interface 130 of the computer device 100 over the network 160. A signal, an instruction, data, etc., received through the communication interface 130 may be forwarded to the processor 120 or the memory 110, and a file, etc., may be stored in a storage medium, for example, the permanent storage device, further includable in the computer device 100.

The I/O interface 140 may be a device used for interfacing with an I/O device 150. For example, an input device may include a device, such as a microphone, a keyboard, a mouse, etc., and an output device may include a device, such as a display, a speaker, etc. As another example, the I/O interface 140 may be a device for interfacing with an apparatus in which an input function and an output function are integrated into a single function, such as a touchscreen. The I/O device 150 may be configured as a single apparatus with the computer device 100.

Also, according to other example embodiments, the computer device 100 may include a greater or smaller number of components than the number of components shown in FIG. 1. However, there is no need to clearly illustrate many conventional components. For example, the computer device 100 may be configured to include at least a portion of the I/O device 150 or may further include other components, such as a transceiver and a database.

FIGS. 2 to 5 illustrate examples of a local compression process for a model according to an example embodiment. FIGS. 2 to 5 schematically illustrate an artificial intelligence (AI) model to explain the concept of model's local compression.

Figure 2:
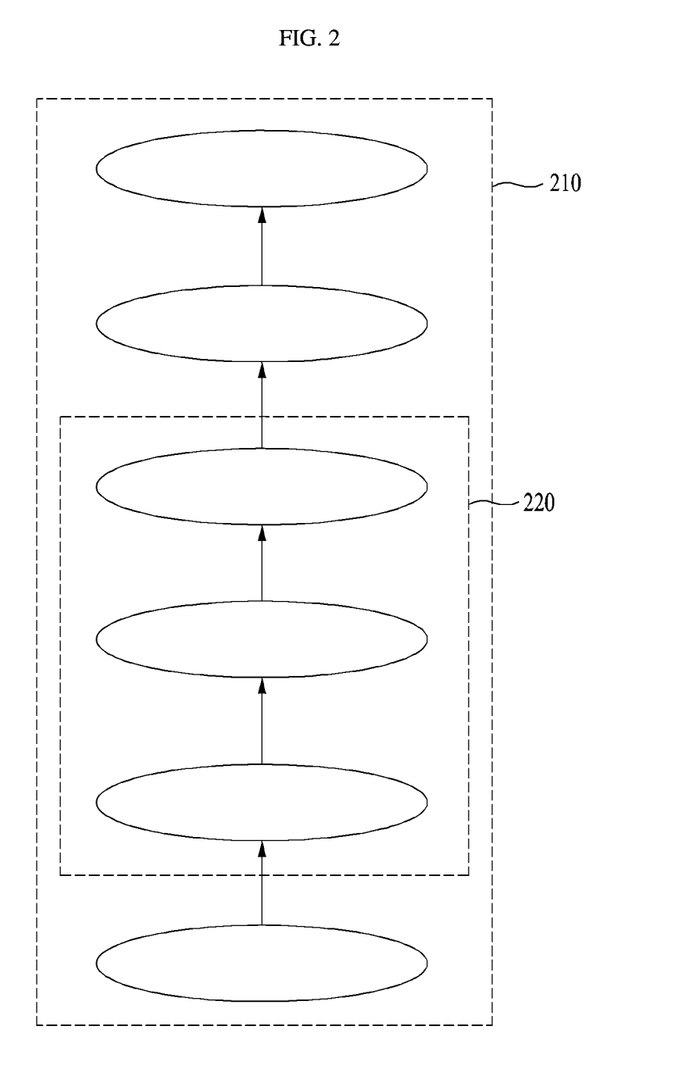
FIGS. 2 to 5 illustrate examples of a local compression process for a model according to an example embodiment.

In FIG. 2, a first box 210 indicated with dotted lines represents an example of a pretrained model that includes a plurality of layers. It is assumed that ellipses in the first box 210 indicated with dotted lines are layers of the pretrained model, respectively. The example embodiment of FIG. 2 simply shows the pretrained model with six ellipses, but it simply schematically illustrates the AI model to explain the concept of local compression for the model and it does not indicate that the number of layers of the AI model according to example embodiments is limited to six. Also, if necessary, a layer represented by each ellipse may include a plurality of sub-layers. Here, in FIG. 2, a second box 220 indicated with dotted lines represents a layer group that includes layers selected for local compression in the pretrained model. Although the example embodiment shows an example in which three ellipses are selected through the second box 220 indicated with dotted lines, it is also simply to explain the concept of local compression for the model and the number of selected layers is not limited.

Figure 3:
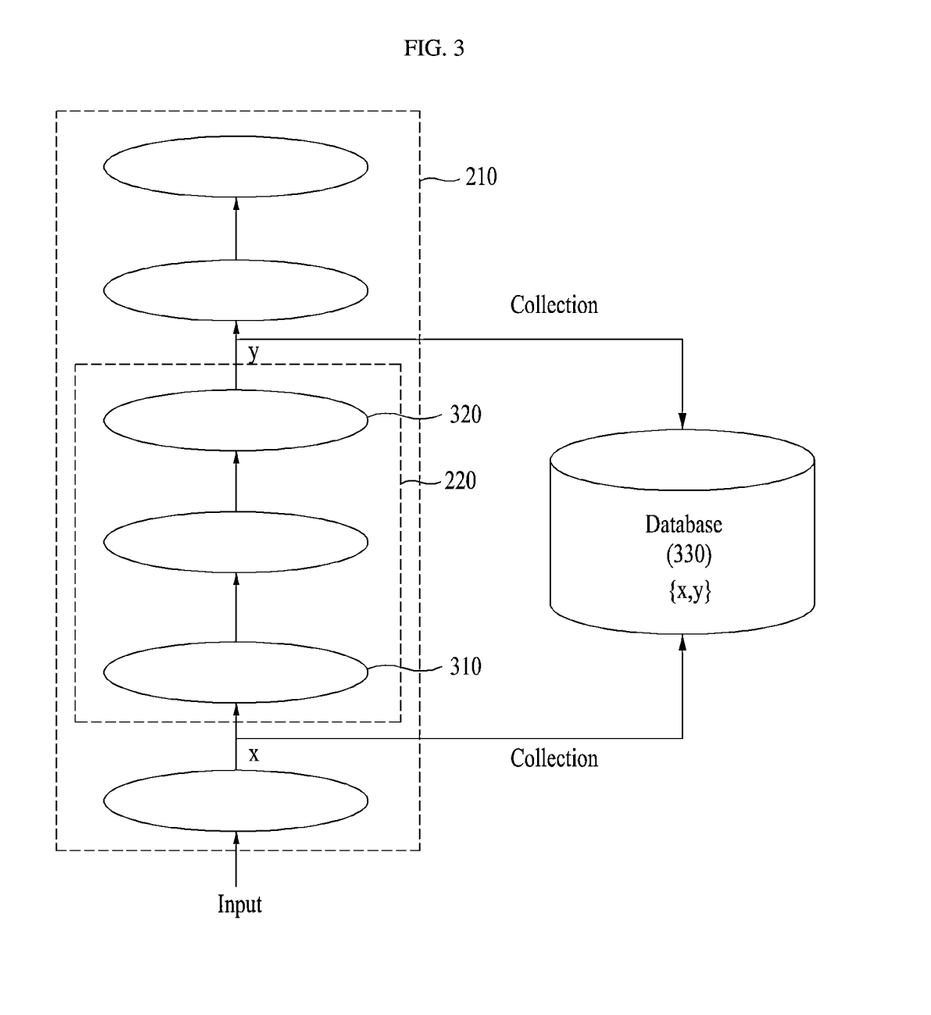

FIG. 3 shows an example of, when input to the pretrained model is received, collecting input data x to a first layer 310 of the layer group shown in the second box 220 indicated with dotted lines and output data y from a last layer 320 of the layer group and storing the same in a database 330.

Figure 4:
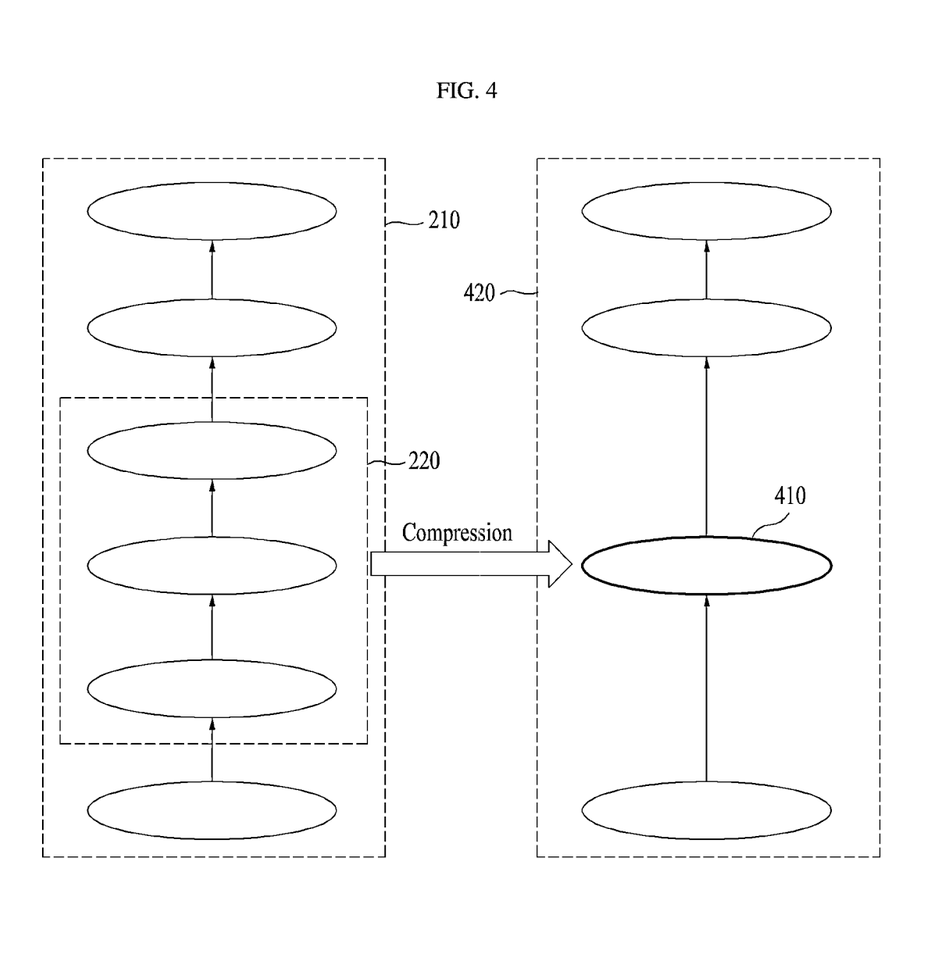

FIG. 4 shows an example of generating a compressed layer group 410 by compressing the layer group shown in the second box 220 indicated with dotted lines. Here, FIG. 4 shows the compressed layer group 410 as a relatively thick ellipse compared to other ellipses. Here, a compression method may use one of various known model compression methods, such as pruning, filter decomposition (FD), and layer removal method. Here, a third box 420 indicated with dotted lines represents an example of the AI model that includes the compressed layer group 410, instead of the layer group shown in the second box 220 indicated with dotted lines.

Figure 5:
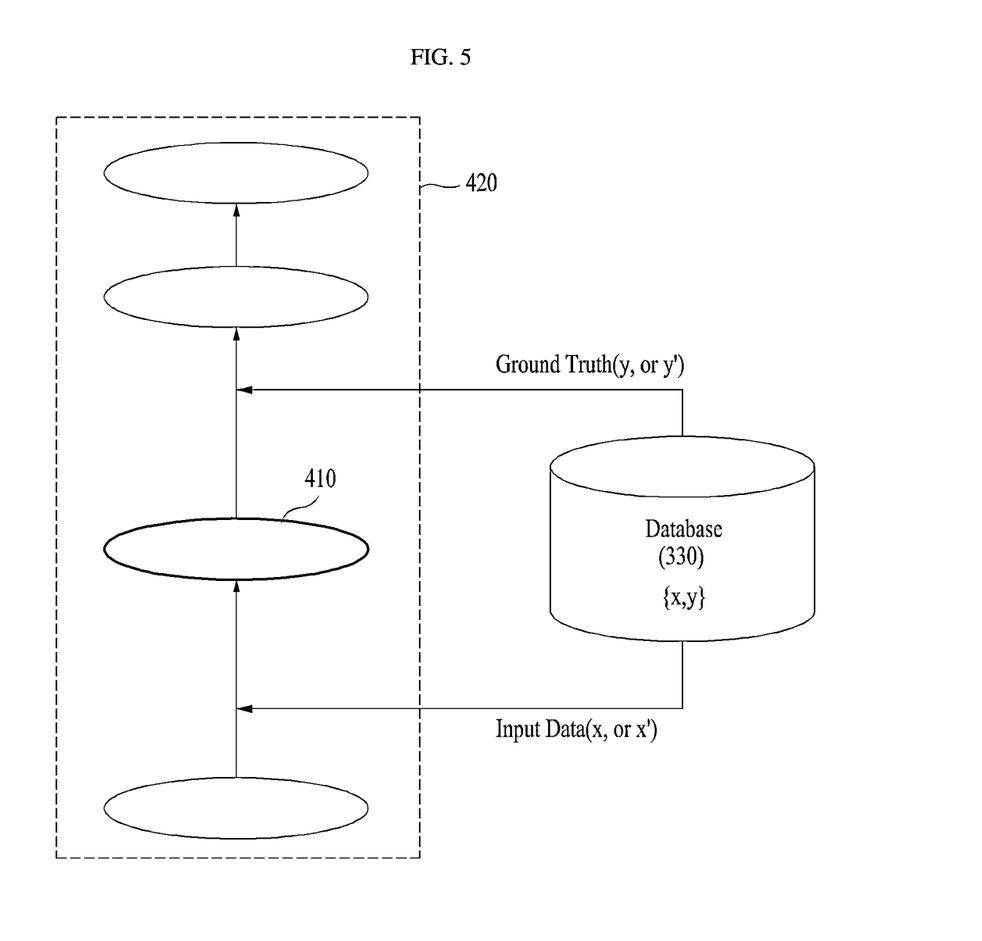

FIG. 5 shows an example of performing retraining by performing fine-tuning on the compressed layer group 410 in FIG. 4 using data stored in the database 330 in FIG. 3. Here, the input data x stored in the database 330 may be used as input data for fine-tuning of the compressed layer group 410, and the output data y stored in the database 330 may be used as ground truth (GT) for fine-tuning of the compressed layer group 410. Depending on example embodiments, input data x' designated by the input data x and ground truth y' designated by the output data y may be used for fine-tuning of the compressed layer group 410.

As such, according to example embodiments of FIGS. 2 to 5, by storing the input data x and the output data y of the layer group selected in the pretrained model and then compressing the layer group and by retraining only the compressed layer group rather than retraining the entire model that includes the compressed layer group, retraining cost for the existing LLM and AI model using very high training cost may be reduced.

Figure 6:
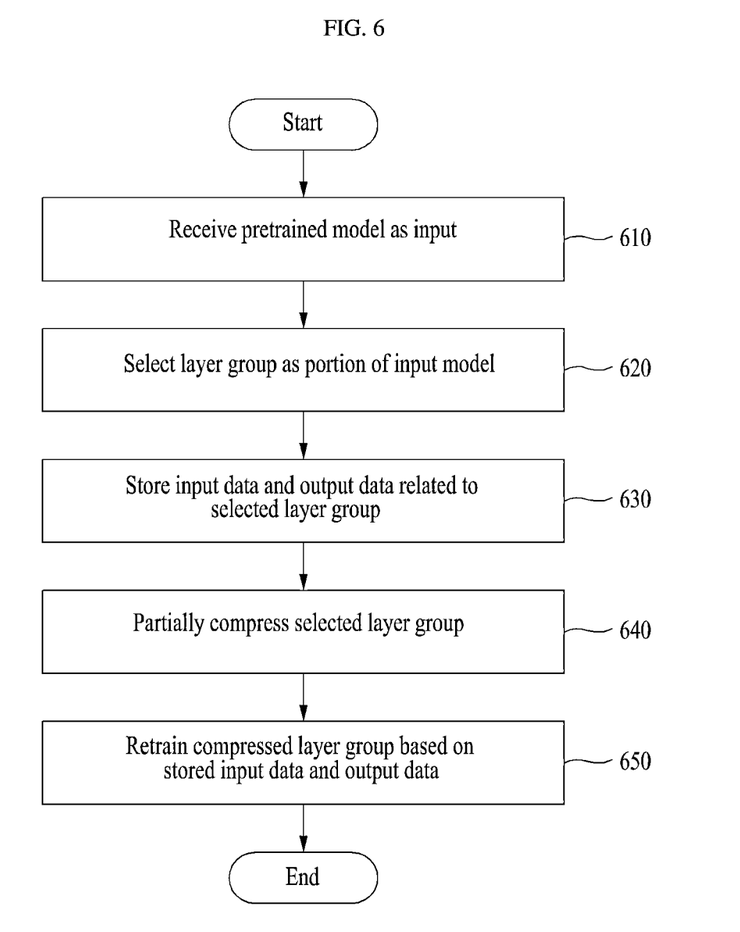
FIG. 6 is a flowchart illustrating a local compression method for a model according to an example embodiment.

FIG. 6 is a flowchart illustrating a local compression method for a model according to an example embodiment. The local compression method for the model according to the example embodiment may be performed by the computer device 100 of FIG. 1. Here, the processor 120 of the computer device 100 may be implemented to execute a control instruction according to a code of at least one computer program or a code of an operating system (OS) included in the memory 110. Here, the processor 120 may control the computer device 100 to perform operations 610 to 650 included in the method of FIG. 6 in response to a control instruction provided from the code stored in the computer device 100.

In operation 610, the computer device 100 may receive a pretrained model as input. The input model may include, for example, an LLM that includes a plurality of transformer block layers, but is not limited thereto. Training cost of the LLM is very large due to a model size and thus is described as an example that may significantly reduce such training cost through local compression for the model according to example embodiments. Accordingly, example embodiments may be applied to any types of AI models that allow local compression and local retraining described above with reference to FIGS. 2 to 5.

In operation 620, the computer device 100 may select a layer group as a portion of the input model. For example, the computer device 100 may compute importance for each layer included in the input model and may select the layer group based on the computed importance. Importance of a layer may be computed using one of known methods to compute the importance of layers included in an AI model. As a detailed example, when a pretrained LLM that includes a plurality of transformer block layers is input, the computer device 100 may compute importance of each of the plurality of transformer block layers and may select a layer group that at least includes a transformer block selected based on the computed importance.

Meanwhile, a novel method for computing importance of a layer is proposed herein. In the method, when the pretrained LLM that includes the plurality of transformer block layers is input, the computer device 100 may compute a cosine similarity between (1) a sum of residual connection for input of a block and operation results of the block and (2) the residual connection, in each of the plurality of transformer block layers, and may compute importance of each of the plurality of transformer block layers such that the importance relatively decreases as an increase in the computed cosine similarity. In this case, the computer device 100 may select the layer group that at least includes the transformer block selected based on the importance. For example, according to a decrease in the importance of the transformer block, a probability that the corresponding transformer is included in the layer group may increase.

In operation 630, the computer device 100 may store input data and output data related to the selected layer group. For example, the computer device 100 may store the input data and the output data in the databases 330 described above with reference to FIGS. 3 and 5.

In operation 640, the computer device 100 may partially compress the selected layer group. As described above, the compression method may use one of various model compression methods, such as pruning, filter decomposition (FD), and layer removal method. Here, in the case of the layer removal method, when removing all layers of the layer group, the layer group itself is removed. In this case, a layer to be retrained is absent. Therefore, in the case of using the layer removal method, the layer group may be selected to further include a previous layer and/or a subsequent layer of layers to be removed.

In operation 650, the computer device 100 may retrain the compressed layer group based on the stored input data and output data. For example, the computer device 100 may perform fine-tuning on the compressed layer group using input data for retraining that is designated based on the input data stored in operation 630 and ground truth for retraining that is designated based on the output data stored in operation 630. The input data and the output data stored in operation 630 may be used as are for the input data and the ground truth for the retraining. A portion of the input data and the output data stored in operation 630 may also be used. Considering the aforementioned example of the LLM, the selected layer group may include the transformer block selected based on the importance. In this case, the computer device 100 may compress the layer group by removing the selected transformer block layer from the selected layer group. Here, as described above, in the case of the layer removal method, when removing all layers of the layer group, the layer group itself is removed and, in this case, a layer to be retrained is absent. Therefore, the layer group may further include a previous layer and/or a subsequent layer of the selected transformer block layer along with the selected transformer block layer. For example, when transformer block layers A, B, C, and D are consecutively present in the input model, and the transformer block layer C is selected as a transformer block layer to be removed, the layer group may be selected with at least including other consecutive transformer block layers, such as {B, C, D}, {B, C}, or {C, D}.

Meanwhile, layers included in the layer group may be consecutive layers, but are not limited thereto.

Figure 7:
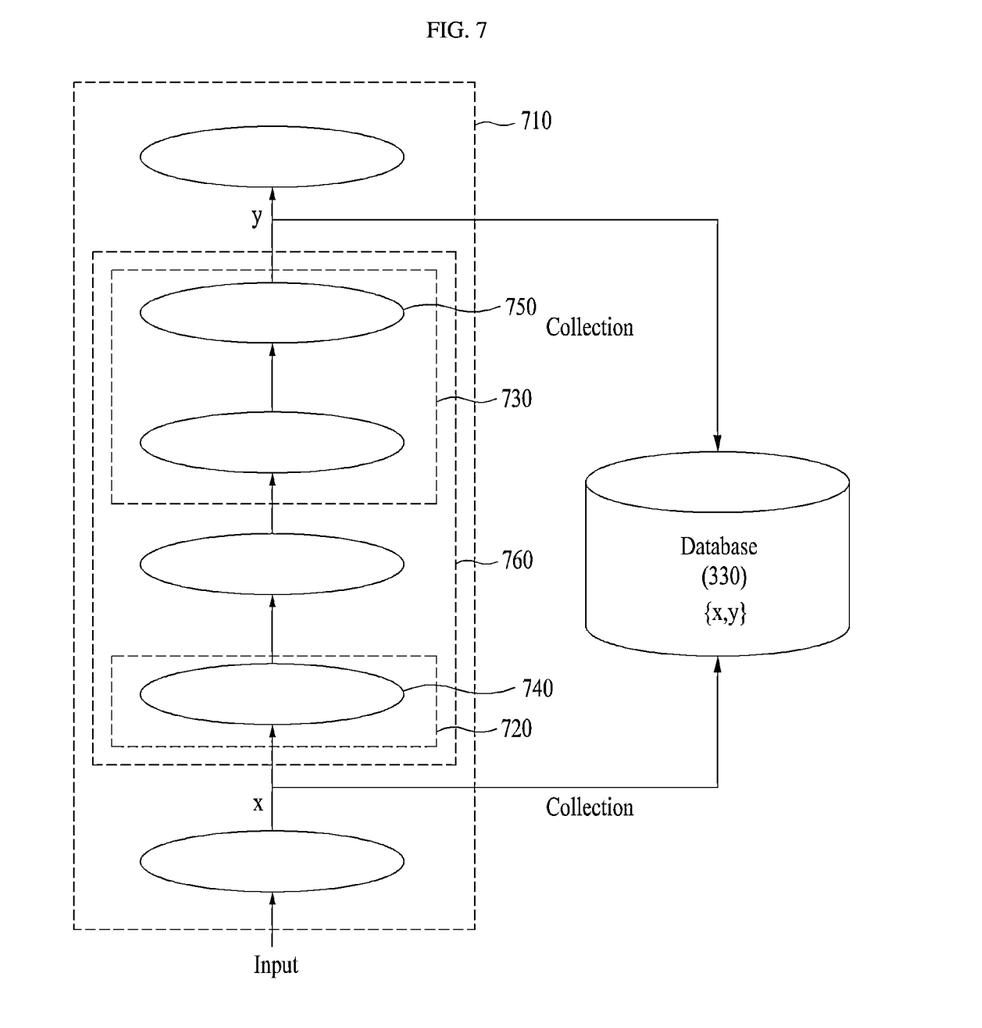
FIG. 7 illustrates an example of layers of a selected layer group according to an example embodiment.

FIG. 7 illustrates an example of layers of a selected layer group according to an example embodiment. In FIG. 7, a first box 710 indicated with dotted lines represents a pretrained model. Here, a second box 720 indicated with dotted lines and a third box 730 indicated with dotted lines represent selected layer groups. In this case, layers of the layer group are not consecutive, but input data x of a first layer 740 of the layer group and output data y of a last layer 750 of the layer group may be stored in the database 330. Here, layer(s) of the second box 720 indicated with dotted lines and layers of the third box 730 indicated with dotes lines may be individually compressed. In this case, it may be easily understood that retraining may be performed on layers included in a fourth box 760 indicated with dotted lines. Depending on example embodiments, the layers included in the fourth box 760 indicated with dotted lines may be selected as a layer group such that the layer group may include consecutive layers. In this case, some loss may occur in performance depending on compression of unselected layers, but some lost performance may be compensated for through retraining. At the same time, training cost of the model may be reduced through the local compression and retraining for the model.

Figure 8:
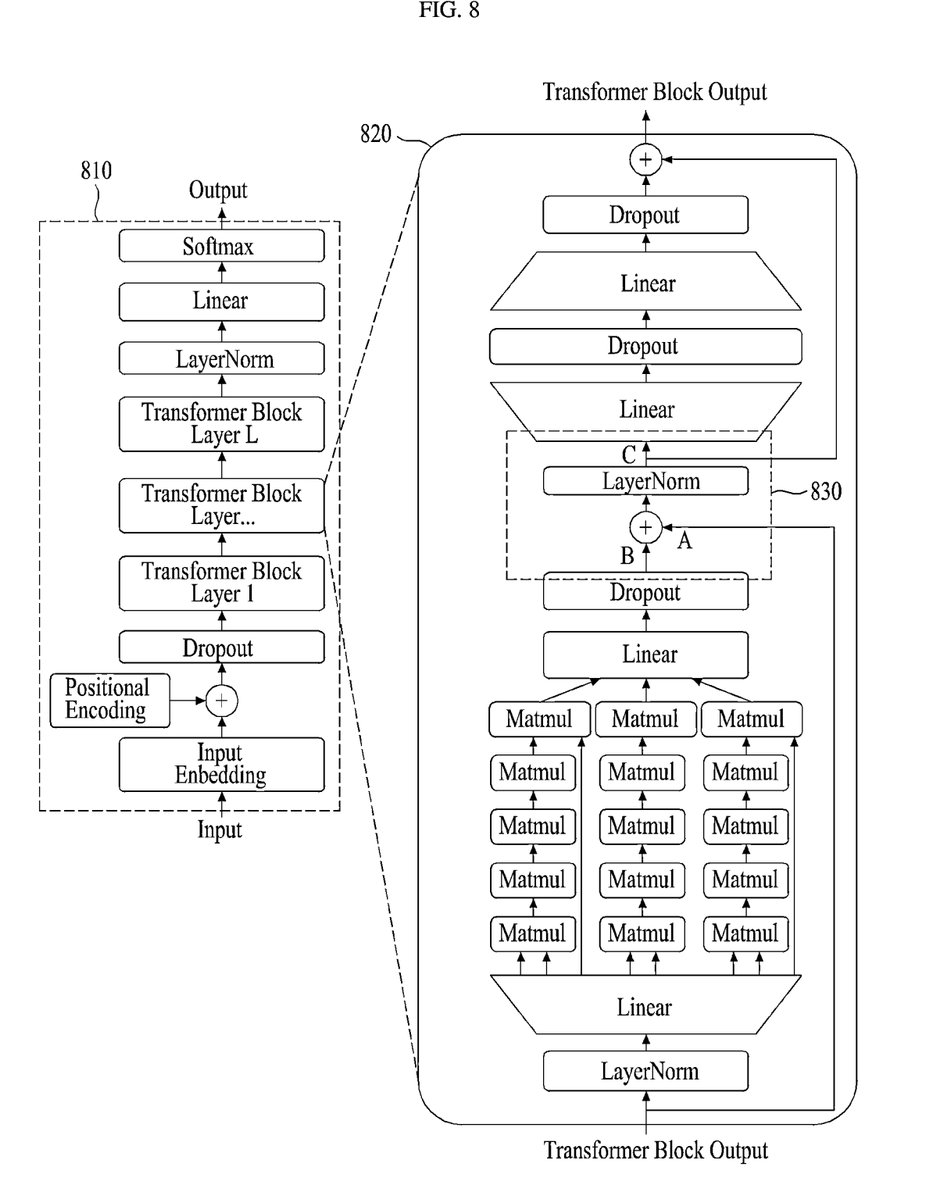
FIG. 8 illustrates an example of computing importance in a transformer block according to an example embodiment.

FIG. 8 illustrates an example of computing importance in a transformer block according to an example embodiment. In FIG. 8, a first box 810 indicated with dotted lines represents an example of an LLM that includes a plurality of transformer block layers. Also, FIG. 8 shows an example of an internal configuration of one transformer block layer 820 among the plurality of transformer block layers included in the LLM. The transformer block layer has the same input and output dimension and residual connection is present within a block. Since a structure of the LLM or an internal configuration of the transformer block layer 820 is already well known, detailed description is omitted.

Here, in the example embodiments, if importance of an internal component is determined to be low by comparing a sum of input and output of a block within the transformer block layer 820 and input of the corresponding block, the corresponding transformer block layer 820 may be determined to be removed. For example, the computer device 100 may compute cosine similarity (A, C) between A (residual connection for input of block included in transformer block layer 820) and C (sum of operation results of block and residual connection), shown in a second box 830 indicated with dotted lines in FIG. 8. In this case, the computer device 100 may compute the importance of the transformer block layer 820 such that the importance relatively decreases as an increase in the computed cosine similarity.

As described above, the computer device 100 may select at least one transformer block layer from among the plurality of transformer block layers based on the importance and may select the layer group that at least includes the selected transformer block layer. Then, the computer device 100 may achieve the local compression for the model by removing the selected transformer block layer from the layer group and then by performing compression and retraining.

As described above, according to some example embodiments, there may be provided a local compression method for a model and system that may reduce retraining cost through local compression of an AI model.

The systems and/or the apparatuses described herein may be implemented using hardware components, software components, and/or combination of the hardware components and the software components. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. A processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that the processing device may include multiple processing elements and/or multiple types of processing elements. For example, the processing device may include multiple processors or a processor and a controller. In addition, different processing configurations are possible, such as parallel processors.

The software may include a computer program, a piece of code, an instruction, or some combinations thereof, for independently or collectively instructing or configuring the processing device to operate as desired. Software and/or data may be embodied permanently or temporarily in any type of machine, component, physical equipment, virtual equipment, or computer storage medium or device, to provide instructions or data to or to be interpreted by the processing device. The software also may be distributed over network coupled computer systems so that the software is stored and executed in a distributed fashion. The software and data may be stored by one or more computer readable storage mediums.

The methods according to the example embodiments may be implemented in the form of program instructions executable through various computer methods and recorded in non-transitory computer-readable media. Also, the media may include, alone or in combination with the program instructions, data files, data structures, and the like. The media may continuously store computer-executable programs or may temporarily store the same for execution or download. Also, the media may be various types of recording devices or storage devices in the form in which one or a plurality of hardware components are combined. Without being limited to media directly connected to a computer system, the media may be distributed over the network. Examples of the media include magnetic media such as hard disks, floppy disks, and magnetic tapes; optical media such as CD ROM and DVD; magneto-optical media such as floptical disks; and hardware devices that are specially to store and perform program instructions, such as read-only memory (ROM), random access memory (RAM), flash memory, and the like. Examples of other media may include recording media and storage media managed by an app store that distributes applications or a site, a server, and the like that supplies and distributes other various types of software. Examples of the program instructions include a machine language code such as produced by a compiler and an advanced language code executable by a computer using an interpreter.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A local compression method for a model performed by a computer device comprising at least one processor, the method comprising:
   receiving, by the at least one processor, a pretrained model as input;
   selecting, by the at least one processor, a layer group as a portion of the pretrained model; and
   partially compressing, by the at least one processor, the selected layer group and retraining the compressed layer group,
   wherein the retraining of the compressed layer group comprises retraining the compressed layer group based on input data and output data prestored for the selected layer group, the pretrained model includes a large language model (LLM) having at least one billion parameters, wherein the pretrained model includes a plurality of transformer block layers, and the selecting of the layer group comprises computing importance of each of the plurality of transformer block layers based on a similarity between i) a residual connection for an input of a block of said each of the plurality of transformer block layers and ii) a sum of operation results of the block and the residual connection, and selecting the layer group that at least includes a transformer block layer selected according to the importance from among the plurality of transformer block layers.

2. The method of claim 1, wherein the prestored input data and output data include input data to a first layer of the selected layer group and output data from a last layer of the selected layer group.

3. The method of claim 1, wherein the retraining comprises performing fine-tuning on the compressed layer group using input data for the retraining that is designated based on the prestored input data and ground truth for the retraining that is designated based on the output data.

4. The method of claim 1, wherein the similarity is cosine similarity, and the selecting of the layer group comprises computing the importance of each of the plurality of transformer block layers such that the importance relatively decreases as an increase in the computed cosine similarity.

5. The method of claim 1, wherein the retraining comprises compressing the layer group by removing the selected transformer block layer from the selected layer group.

6. A non-transitory computer-readable record medium storing instructions that, when executed by a processor, cause the processor to execute the method of claim 1 on the computer device.

7. A computer device comprising:

at least one processor configured to execute computer-readable instructions on the computer device, wherein the at least one processor is configured to, receive a pretrained model as input, select a layer group that includes some layers of the pretrained model for local compression from the pretrained model, and partially compress the selected layer group and retrain the compressed layer group, retraining of the compressed layer group comprises retraining the compressed layer group based on input data and output data prestored for the selected layer group, the pretrained model includes a large language model (LLM) having at least one billion parameters, wherein the pretrained model includes a plurality of transformer block layers, and to select the layer group, the at least one processor is configured to compute importance of each of the plurality of transformer block layers based on a similarity between i) a residual connection for an input of a block of said each of the plurality of transformer block layers and ii) a sum of operation results of the block and the residual connection, and select the layer group that at least includes a transformer block layer selected according to the importance from among the plurality of transformer block layers.

8. The computer device of claim 7, wherein the prestored input data and output data include input data to a first layer of the selected layer group and output data from a last layer of the selected layer group.

9. The computer device of claim 7, wherein, to perform retraining, the at least one processor is configured to perform fine-tuning on the compressed layer group using input data for the retraining that is designated based on the prestored input data and ground truth for the retraining that is designated based on the output data.

10. The computer device of claim 7, wherein the similarity is cosine similarity, and to select the layer group, the at least one processor is configured to compute the importance of each of the plurality of transformer block layers such that the importance relatively decreases as an increase in the computed cosine similarity.

* * * * *